3,405,007
FUEL CELL ELECTRODE AND PROCESS
FOR ITS MANUFACTURE
Robert F. Waters, Hammond, Ind., assignor to Standard Oil Company, Chicago, Ill., a corporation of Indiana
No Drawing. Filed Oct. 22, 1965, Ser. No. 502,477
9 Claims. (Cl. 136—86)

The present invention relates to fuel cells and more particularly to improved fuel cell electrodes and to novel methods of making the same.

A fuel cell is an electrochemical device in which chemical energy is directly converted into electrical energy. The conversion to useful electrical energy may proceed continuously and with more efficiency than conventional means of energy production. The basic requirements of a fuel cell are: at least one fuel electrode (the anode), at least one oxygen electrode (cathode), an electrolyte and suitable housing.

During operation of the fuel cell, a combustible fuel, e.g. hydrogen, carbon monoxide, hydrocarbon, etc., and an oxidizing gas, e.g. oxygen, are introduced to the anode and cathode respectively where they are chemically adsorbed. A complementary half cell reaction occurs at each electrode. At the anode, the reaction causes a loss of electrons, which flow from the anode to the cathode in the external circuit. This constitutes the electrical output of the cell and supports the oxygen half of the reaction which occurs at the cathode. Oxygen is reacted at said cathode to form negatively charged ions which migrate to the anode, and the positive ions formed at the anode migrate to the cathode. The fuel ions react with the oxidizing ions to form a neutral product and the combined reactions occurring at the anode and cathode respectively give the net cell reaction.

The rate of electrochemical reaction depends upon the areas within the cell that are simultaneously exposed to the reactant, i.e. the fuel or oxidant as the case may be, to the electrolyte and to the electrode. The electrode provides the site where the fuel cell reaction occurs and also acts as an electrical conductor for the current flow. It must furnish the proper conditions for the establishment of reactive interfaces wherein the fuel or oxygen is chemisorbed, and the respective half cell reaction occurs. The problem of providing a greater number of interfaces has been the subject of much research. It has been established that porous structures will provide highly efficient electrodes since easy flow of reactant to the reaction zone is of prime importance. Porous carbon has been found to be a suitable material for the construction of an electrode body because it provides large surface areas per unit of volume and is of itself a relatively good electron conductor.

It has also been found that some catalysts will accelerate the chemisorption of the reactant so that the reaction itself is thereby accelerated. The over-all efficiency of a fuel cell is directly related to the promotional effect of the catalytic agent. The greater the activity of the catalytic agent, the smaller the energy loss due to chemisorption. By reducing the amount of this energy loss in the cell, the efficiency and output of the cell are increased. The catalysts employed usually comprise a metal or metal-containing compound. It has been the practice to associate the catalytic metal or compound with the electrode support. By catalytic metal, as used in the specification and claims, is meant any metal, or combination of metals, which catalyze a fuel cell reaction. In a fuel cell utilizing acidic electrolyte, platinum has been found to be the best catalyst for both electrodes. Although platinum catalysts associated with porous carbon electrode supports are perhaps the most commonly employed electrodes, and are used herein to illustrate the invention, the invention should not be construed as limited thereto. It will be seen, as the description of the invention proceeds, that other catalytically active metals may be used, e.g. those metals of Groups VIII, I-B, etc. of the periodic table, and other porous electrode bases may be utilized in accordance with the present invention, such as porous metal.

Heretofore, methods of associating a porous electrode with catalysts have included electrolytic deposition, reduction by hydrogen, decomposition by oxygen, and reduction by such reducing agents as hydrazine or sodium borohydride. Electrolytic deposition tends to give a non-uniform deposit, with sites on the face of the electrode closest to the counter electrode being favored as deposition sites. Decomposition by air or oxygen requires very high temperatures and/or long periods of treatment. Hydrazine and sodium borohydride reduce the catalytic metal so vigorously that the reaction may be difficult to control or losses of the catalyst may occur as well as aggregation of the particles.

It has now been discovered that a more active electrode may be prepared by the process of this invention without any of the disadvantages of the above methods. It has also been found that the resulting electrode has a more uniform deposit of catalyst and may be used with significantly reduced active-metal content, which reduces costs and still provides excellent activities.

Briefly, the invention concerns a method for preparing an electrode suitable for a fuel cell which comprises reducing a catalytic metal in situ on an electrically conductive electrode support by means of a dicarboxylic organic reducing acid. The invention also concerns the electrode prepared by this process and the fuel cell utilizing this electrode.

The electrode support is suitably formed of an electrically conductive material. Generally, the purpose of the support is to provide a large surface area for the catalytic agent, and, therefore the form of the support is normally a finely divided material or a porous material, such as porous metal or carbon. The catalyst containing salts may suitably be metallic salts of the organic acids such as citrates, formates, acetates, and the like, but any liquid soluble metal salt may be utilized such as nitrates, sulfates, chlorides, etc. The solvent must be compatible with the electrode support chosen, and for this reason, water-soluble salts are very suitable. Other suitable salts are known or may easily be determined.

In accordance with the present invention a porous electrode support formed of a suitable electrically conductive material such as, for example, carbon or graphite powder is impregnated with a solution of a compound containing sufficient catalyst to be deposited and organic dicarboxylic reducing acid, having the general formula:

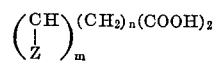

wherein $m$ and $n$ are integers of from 0 to 16 and the sum of $m$ and $n$ is no greater than 16 when both $m$ and $n$ are greater than 0 and wherein Z is selected from hydrogen and the hydroxy group. Suitable acids include oxalic, malonic, succinic, glutaric, tartaric, etc. Oxalic acid is a preferred acid. Said acid should be sufficiently soluble to provide the necessary amount of deposited acid for the reduction of the catalytic metal.

Where the electrode support chosen, is such that impregnation is difficult, it is preferable to use a wetting or surface active agent. Such agent should, of course, be non-reactive with the catalyst. Water-soluble, low boiling ketones are usually quite satisfactory because of the ease of removal after impregnating the support with the catalytic solution. Acetone and methyl ethyl ketone are examples of suitable wetting or surface active agents.

The catalytic metals which may be used in accordance with this invention include such metals as ruthenium, rhodium, palladium, osmium, iridium, and platinum, mixtures of these metals, and mixtures of one or more of these metals with other metals such as titanium, vanadium, chromium, manganese, iron, cobalt, nickel, copper, niobium, molybdenum, technetium, silver, hafnium, tantalum, tungsten, rhenium, and gold; but not these exclusively. The preferred catalytic metal is platinum. The molar ratio of acid:catalyst may be in the range of from about 1:1 to about 15:1.

After the pores of the support are filled with the solution, the electrode is dried so as to evaporate off any solvent. A suitable drying temperature may be fixed as somewhere in the range of the boiling point of the particular solvent(s) involved. It is preferable not to dry above 150° C.

Following impregnation and drying, the electrode is subjected to a reduction step. The catalytic compound is reduced to metallic form in situ, by heating the electrode at a temperature of from about 130° C. to about 200° C., preferably from 150° C. to 170° C., for between one and twenty-four hours. It is preferable to accomplish the reduction in an oxygen-free atmosphere, such as for example, nitrogen. The time of reduction will vary with the temperature, so that the lower the reduction temperature, the longer the time required for reduction.

If desired, any unreduced catalytic metal may then be reduced by any known reduction method, even though such method would have initially been difficult to control. A suitable method would comprise contacting the catalyst deposited by the process of the present invention with a solution of hydrazine. The hydrazine may then be removed by washing with water. Finally, if desired, the electrode may then be calcined. The calcining temperature may be in the range of from 250° C. to 1500° C. for one minute to 24 hours. Calcining is desirable where the catalyst is composed of at least two metals.

The above process results in an electrode which is very suitable for a fuel cell. The fuel cell comprises at least two electrodes separated by and in direct contact with an electrolyte, at least one of said electrodes prepared by the process of this invention.

The following examples illustrate the present invention but should not be construed as limiting the scope of the invention thereto.

Example I

A porous-graphite disk, one inch in diameter by ¼" thick, was impregnated with a solution of chloroplatinic acid and oxalic acid. The solution contained enough platinum to yield a completed electrode containing one weight percent platinum. The molar ratio of the oxalic acid to the chloroplatinic acid was 3.5 to 1. After impregnation, the electrode was dried for thirty minutes at 110° C., and then heated for two hours at 170° C. in an atmosphere of nitrogen. The electrode was then placed in a desiccator containing a hydrazine atmosphere and allowed to stand overnight. This was followed by a slow, dropwise addition of a 10% solution of hydrazine until the disk was saturated and was then well submerged in the hydrazine and was then allowed to stand for an additional two hours. The electrode was then thoroughly washed with distilled water, dried for one hour at 110° C. and calcined for one minute at 800° C. in nitrogen.

Example II

An electrode was prepared following a similar procedure as that of Example I. Reduction by a solution of oxalic acid and chloroplatinic acid in the molar ratio of 3.5 to 1 respectively for two hours at 160° C., was followed by hydrazine treatment but with no final calcination.

Example III

Following the procedure of Example I, an electrode was reduced by a 3:1 molar ratio of oxalic acid:chloroplatinic acid for sixteen hours at 160° C., followed by hydrazine treatment but with no final calcination.

Examples IV–VII

Four electrodes were prepared as in Example I except that the reducing acid was as follows:

Example:

IV _____ Malonic.
V _____ Tartaric.
VI _____ Succinic.
VII _____ Glutaric.

The electrodes prepared in accordance with Examples I–VII were evaluated in an experimental fuel cell. The electrodes were tested as an anode and/or a cathode. For testing as an anode the fuel was 30% ethanol by volume and 30 weight percent sulfuric acid, the cathode was $PbO_2$, and the temperature was 55° C. For testing as a cathode, the feed was oxygen, saturated with water at room temperature, the anode was lead, and the temperature was 55° C. For comparison with the experimental electrodes, blank electrodes were prepared containing 1 weight percent platinum but were not prepared with oxalic acid. They were reduced with hydrazine only. These blank electrodes were also tested as anodes and cathodes.

The following table shows a comparison of the experimental and blank electrodes. The results of the tests made with the electrodes of Examples I–III are reported in Table I, and the tests made with the electrodes of Examples IV–VII are reported in Table II. In comparing the data from the tests, it should be noted that the higher the values of the voltages, the better the performance obtained from the electrode, and that the better catalyst will give rise to less of a voltage drop as the current density increases, than will a poorer catalyst. The voltages, corrected for the internal resistance of the tested cell, at different current densities are listed:

TABLE I.—ELECTRODE

| Current Density, ma./cm.² | Voltage (IR, free) vs. $PbO_2$ | | Voltage (IR, free) vs. Pb | | Anode of Ex. 2 | Cathode of Ex. 3 |
|---|---|---|---|---|---|---|
| | Anode of Ex. 1 | Blank Anode | Cathode of Ex. 1 | Blank Cathode | | |
| 2 | 1.13 | 1.08 | 1.09 | 1.02 | 1.19 | 1.21 |
| 6 | 1.06 | 0.99 | 1.00 | 0.93 | 1.11 | 1.12 |
| 10 | 1.03 | 0.93 | 0.96 | 0.86 | 1.07 | 1.07 |
| 20 | 0.91 | 0.78 | 0.85 | 0.72 | 0.98 | 0.97 |
| 40 | 0.79 | 0.49 | 0.75 | 0.48 | 0.86 | 0.82 |

TABLE II

| Current density, ma./cm.² | Anode | | | | Cathode | | | |
|---|---|---|---|---|---|---|---|---|
| | Ex. IV | Ex. V | Ex. VI | Ex. VII | Ex. IV | Ex. V | Ex. VI | Ex. VII |
| 2 | 1.12 | 1.12 | 1.14 | 1.09 | 1.17 | 1.20 | 1.15 | 1.09 |
| 6 | 1.04 | 1.09 | 1.07 | 1.04 | 1.09 | 1.15 | 1.09 | 1.06 |
| 10 | 1.00 | 1.06 | 1.03 | 1.01 | 1.05 | 1.13 | 1.06 | 1.03 |
| 20 | 0.98 | 1.03 | 0.98 | 0.94 | 0.98 | 1.09 | 1.01 | 0.99 |
| 40 | 0.91 | 0.98 | 0.90 | 0.77 | 0.88 | 1.05 | 0.90 | 0.93 |

The results in Tables I and II demonstrate that the electrodes, prepared by the process of this invention, produced higher voltages and smaller voltage drops than the control or blank electrodes, thus indicating a very material improvement.

Thus having described the invention, what is claimed is:
1. In a method for uniformly depositing a catalytic metal on a porous, electrically conductive electrode support, the improvement which consists of impregnating said electrode support with a solution containing a soluble compound of said catalytic metal along with an organic dicarboxylic reducing acid having the general formula:

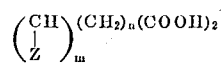

wherein $m$ and $n$ are integers of from 0 to 16 and the sum of $m$ and $n$ is no greater than 16 when both $m$ and $n$ are greater than 0 and wherein Z is selected from hydrogen and the hydroxy group, said organic dicarboxylic reducing acid being present in an amount sufficient to reduce the desired amount of catalytic metal compound; followed by heating said impregnated electrode between about 130° C. to about 200° C., for about from 1 to 24 hours in an oxygen-free atmosphere, whereby said catalytic metal compound is reduced by said reducing acid.

2. The method of claim 1 wherein the compound of catalytic metal is chloroplatinic acid.

3. The method of claim 1 wherein the organic acid is oxalic acid.

4. The method of claim 1 wherein the mole ratio of organic acid:catalytic metal is between 2:1 to 5:1.

5. The method of claim 1 wherein the temperature is in the range of 150° C. to 170° C.

6. In a method for uniformly depositing a catalytic metal on a porous, electrically conductive electrode support, the improvement which consists of impregnating said electrode support with a solution containing a soluble compound of said catalytic metal along with an organic dicarboxylic reducing acid having the general formula:

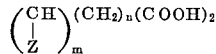

wherein $m$ and $n$ are integers of from 0 to 16 and the sum of $m$ and $n$ is no greater than 16 when both $m$ and $n$ are greater than 0 and wherein Z is selected from hydrogen and the hydroxy group, said organic dicarboxylic reducing acid being present in an amount sufficient to reduce the desired amount of catalytic metal compound; heating said impregnated electrode between about 130° C. to about 200° C. for from about 1 to 24 hours in an oxygen-free atmosphere, whereby said catalytic metal compound is reduced by said reducing acid, and then reducing any unreduced catalytic metal with hydrazine.

7. In a method for uniformly depositing a catalytic metal on a porous, electrically conductive electrode support, the improvement which consists of impregnating said electrode support with a solution containing a soluble compound of said catalytic metal along with an organic dicarboxylic reducing acid having the general formula:

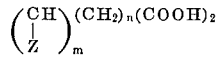

wherein $m$ and $n$ are integers of from 0 to 16 and the sum of $m$ and $n$ is no greater than 16 when both $m$ and $n$ are greater than 0 and wherein Z is selected from hydrogen and the hydroxy group, said organic dicarboxylic reducing acid being present in an amount sufficient to reduce the desired amount of catalytic metal compound; heating said impregnated electrode between about 130° C. to about 200° C. for from about 1 to 24 hours in an oxygen-free atmosphere whereby said catalytic metal compound is reduced by said reducing acid, followed by calcination.

8. An electrode prepared by the method of claim 1.

9. A fuel cell adapted to directly convert the reaction of an oxidizing agent and an oxidizable fuel to electricity which comprises at least two electrodes and an electrolyte therebetween, at least one of said electrodes prepared by the method which comprises impregnating said electrode support with a solution containing a soluble compound of a catalytic metal along with an organic dicarboxylic reducing acid having the general formula:

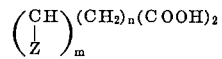

wherein $m$ and $n$ are integers of from 0 to 16 and the sum of $m$ and $n$ is no greater than 16 when both $m$ and $n$ are greater than 0 and wherein Z is selected from hydrogen and the hydroxy group, said reducing acid being present in an amount sufficient to reduce the desired amount of catalytic metal compound; followed by heating said impregnated electrode between about 130° C. to about 200° C., for about from 1 to 24 hours in an oxygen-free atmosphere, whereby said catalytic metal compound is reduced by said reducing acid, and an effective electrode is thus produced after a single impregnation with the solution containing the soluble compound of said catalytic metal along with the organic dicarboxylic reducing acid.

References Cited

UNITED STATES PATENTS

| 3,294,572 | 12/1966 | Piccione et al. | 117—46 XR |
| 3,316,124 | 4/1967 | Kronenberg | 117—227 |
| 2,773,844 | 12/1956 | Carlson et al. | 117—123 |
| 3,235,473 | 2/1966 | LeDuc | 136—120 XR |

WINSTON A. DOUGLAS, *Primary Examiner.*

O. CRUTCHFIELD, *Assistant Examiner.*